(12) United States Patent
Monier (10) Patent No.: US 6,237,015 B1
(45) Date of Patent: May 22, 2001

(54) METHOD FOR THE PRODUCTION OF A PARAMETER J0 ASSOCIATED WITH THE IMPLEMENTATION OF MODULAR OPERATIONS ACCORDING TO THE MONTGOMERY METHOD

(75) Inventor: M. Guy Monier, Rognac (FR)

(73) Assignee: STMicroelectronics, S.A., Gentilly (FR)

( * ) Notice: Subject to any disclaimer, the term of this patent is extended or adjusted under 35 U.S.C. 154(b) by 0 days.

(21) Appl. No.: 09/224,445

(22) Filed: Dec. 31, 1998

(30) Foreign Application Priority Data

Dec. 31, 1997 (FR) .................................................. 97 16863

(51) Int. Cl.[7] ........................................................ G06F 7/00
(52) U.S. Cl. ........................................................... 708/492
(58) Field of Search .................................... 708/491–492; 380/28

(56) References Cited

U.S. PATENT DOCUMENTS

| | | | | |
|---|---|---|---|---|
| 5,513,133 | * | 4/1996 | Cressel et al. ........................ | 708/491 |
| 5,764,554 | * | 6/1998 | Monier ................................. | 708/491 |
| 5,948,051 | * | 9/1999 | Monier ................................. | 708/492 |
| 5,987,489 | * | 11/1999 | Monier ................................. | 708/492 |
| 5,999,953 | * | 12/1999 | Monier ................................. | 708/492 |
| 6,035,317 | * | 3/2000 | Guy ...................................... | 708/492 |
| 6,163,790 | * | 12/2000 | Monier ................................. | 708/491 |

* cited by examiner

*Primary Examiner*—Tan V. Mai
(74) *Attorney, Agent, or Firm*—Theodore E. Galanthay; Allen, Dyer, Doppelt, Milbrath & Gilchrist, P.A.

(57) ABSTRACT

The parameter J0 associated with the implementation of modular operations according to the Montgomery method is generated in an integrated circuit. J0 is encoded on Q*L bits such that $J0 = J0_{Q-1} \ldots J0_0$, wherein Q and L are integers. Loops are formed for the computation of the binary data elements $J0_j$ according to a known method, which is used for generating the sub-operands of L bits. A coprocessor is used for updating, by multiplication, of the value of a data element of Q*L bits of which the L least significant bits are used for the computation of the values of $J0_j$.

19 Claims, 5 Drawing Sheets

METHOD FOR THE PRODUCTION OF A PARAMETER J0 ASSOCIATED WITH THE IMPLEMENTATION OF MODULAR OPERATIONS ACCORDING TO THE MONTGOMERY METHOD

FIELD OF THE INVENTION

The invention relates to the field of modular operations, and, more particularly, to the generation of a computation parameter used in the implementation of modular operations according to the Montgomery method.

BACKGROUND OF THE INVENTION

Modular operations according to the Montgomery method enable the performance of modular computations in a finite Galois field without carrying out any division. The finite Galois field is denoted as $GF(2^n)$, with $2^n$ elements. These operations are applicable to cryptography for the authentication of messages, the identification of a user, and the exchange of cryptographic keys. Exemplary applications are described in the French patent application No. 2,679,054.

There are commercially available integrated circuits dedicated to such applications, e.g., the product ST16CF54 made by SGS-THOMSON Microelectronics. To carry out modular computations, a dedicated arithmetic coprocessor is used as described in the European patent application No. 601,907. In the implementation of modular operations by the dedicated coprocessor, it is necessary to produce a binary parameter J0 encoded on an integer number Bt of bits, such that $[(J0+N0)+1] \mod 2^{Bt}=0$ with N0 as an odd integer number encoded on Bt bits and mod representing the modulo.

Methods have already been proposed by the assignee of the present invention to produce the parameter J0 using a dedicated circuit, thus enabling this parameter to be computed at a high speed in an integrated circuit. These methods are described in the European patent application 0 778 518 published on Jun. 11, 1996. This application corresponds to the patent application filed Dec. 3, 1996 in the United States under number Ser. No. 08/759,892. An important factor in the performance of modular operations is the computation time needed to produce the desired result.

SUMMARY OF THE INVENTION

The invention provides a higher speed method for generating in an integrated circuit a parameter J0 associated with implementation of modular operations according to the Montgomery method. J0 is encoded on Q*L bits such that $J0=J0_{L-1} \ldots J0_0$, with Q and L being integers. The method comprises the following steps:

Step 1: The loading of a binary data element N0 encoded on Q*L bits is performed. The least significant bit of N0 is equal to 1 in a first register. The loading of Q*L zeros in the second and third register, and the loading of L zeros in a fourth register are performed.

Step 2: A loop of Q iterations is formed, which comprises the following steps, indexed by j, with j varying from 0 to Q−1:

Step 2.1: Forming a loop of L iterations, indexed by i with i varying from 0 to L−1, and comprising the steps of shifting the contents of the fourth register by one unit towards the right. This operation corresponds to a division by two of the contents of this register while overlooking the remainder. The bit derived from this shift is tested in a test circuit. If the bit checked is a 1, the following steps are performed. A rightward shifting is performed for the contents of the third register by one unit towards the right and a zero is loaded. This is done on the most significant bit of the third register and in a fifth register. The bit-by-bit addition of the contents of the fourth register with a zero in a first adder is performed. An output of this first adder is connected to the input of the fourth register. The testing of a second least significant bit at an output of the first adder is performed.

If the bit checked is not a 1, the following steps are performed. A rightward shifting of the contents of the third register by one unit towards the right is performed. The loading of a 1 on the most significant bit of the third register and in the fifth register is performed. The bit-by-bit addition of the contents of the fourth register and the L last bits of the first register in the first adder is performed. The output of this first adder is provided to the input of the fourth register. The first register forms an L bit register whose input and output are provided, and the second least significant bit at an output of the first adder is tested.

Step 2.2: The contents of the entire first register are shifted and the multiplication, in a multiplication circuit, of the contents of the first register by the contents of the fifth register is performed. The fifth register is replenished with logic zeros if its size is greater than L. The shifting of the contents of the second register and the addition of these contents with the result of the multiplication, encoded on Q*L+L bits, is performed in a second adder. The Q*L most significant bits of the binary data element produced by the second adder are stored in the second register. The L least significant bits of these Q*L bits are stored in the fourth register.

According to one mode of operation, the step 2.2 is performed as follows. During the Q−1 first iterations, the shifting of the contents of the entire first register and the multiplication in a multiplication circuit of the contents of the first register by the contents of the fifth register is performed. This fifth register has been replenished with logic zeros if its size is greater than L. The shifting of the contents of the second register and the addition of these contents with the result of the multiplication, encoded on Q*L+L bits, is performed in a second adder. The Q*L most significant bits of the binary data element produced by the second adder are stored in the second register. The L least significant bits of these Q*L bits in the fourth register are stored.

According to another mode of operation, the step 2.2 is performed as follows. The shifting of the contents of the entire first register and the multiplication, in a multiplication circuit, of the contents of the first register by the contents of the fifth register is performed. This fifth register has been replenished with logic zeros if its size is greater than L. The shifting of the contents of the second register and the addition of these contents with the result of the multiplication, encoded on Q*L+L bits, is performed in a second adder. The [Q−j]*L most significant bits of the binary data element produced by the second adder are stored in a second register. The L least significant bits of these [Q−j]*L bits are stored in the fourth register.

According to yet another mode of operation, the step 2.2 is performed as follows. During the Q−1 first iterations, the shifting of the contents of the entire first register and the multiplication, in a multiplication circuit, of the contents of the first register by the contents of the fifth register is performed. This fifth register has been replenished with logic zeros if its size is greater than L. The shifting of the contents of the second register and the addition of these contents with the result of the multiplication, encoded on Q*L+L bits, is performed in a second adder. The [Q−j]*L most significant bits of the binary data element produced by the second adder are stored in the second register. The L least significant bits of these [Q−j]*L bits are stored in the fourth register.

According to one embodiment, with the variables i=j=0, the step 2.1 is performed as follows. The shifting of the contents of the third register by one unit towards the right and the loading of a 1 on the most significant bit of this third register and in a fifth register is performed. The bit-by-bit addition of the contents of the fourth register with a zero is performed in a first adder. The output of this first adder is provided to the input of the fourth register. The testing of the second least significant bit at the output of the first adder is performed by a test circuit. A loop is formed of L iterations indexed by i with i varying from 0 to L−1 if j is different from 0 and, if not, from 1 to L−1. The loop comprises the steps of shifting the contents of the fourth register by one unit towards the right. This operation corresponds to a division by two of the contents of this register while overlooking the remainder. The bit derived from this shift is tested in a test circuit.

If the bit checked is a 1, the rightward shifting of the contents of the third register by one unit towards the right is performed. The loading of a zero on the most significant bit of the third register and in the fifth register is performed. The bit-by-bit addition of the contents of the fourth register with a zero is performed in the first adder. The output of the first adder is connected to the input of the fourth register. The second least significant bit at the output of the first adder is tested.

If the bit checked is not a 1, the rightward shifting of the contents of the third register by one unit towards the right is performed. The loading of a 1 on the most significant bit of the third register and in the fifth register is performed. The bit-by-bit addition of the contents of the fourth register and the L last bits of the first register is performed in the first adder. The output of the first adder is connected to the input of the fourth register. The first register forms an L bit register whose input and output are connected. The second least significant bit at an output of the first adder is tested.

BRIEF DESCRIPTION OF THE DRAWINGS

Other advantages and particular features shall appear from the following description of an exemplary embodiment of the invention, made with reference to the appended drawings, of which.

DETAILED DESCRIPTION OF THE PREFERRED EMBODIMENTS

Figure 1:
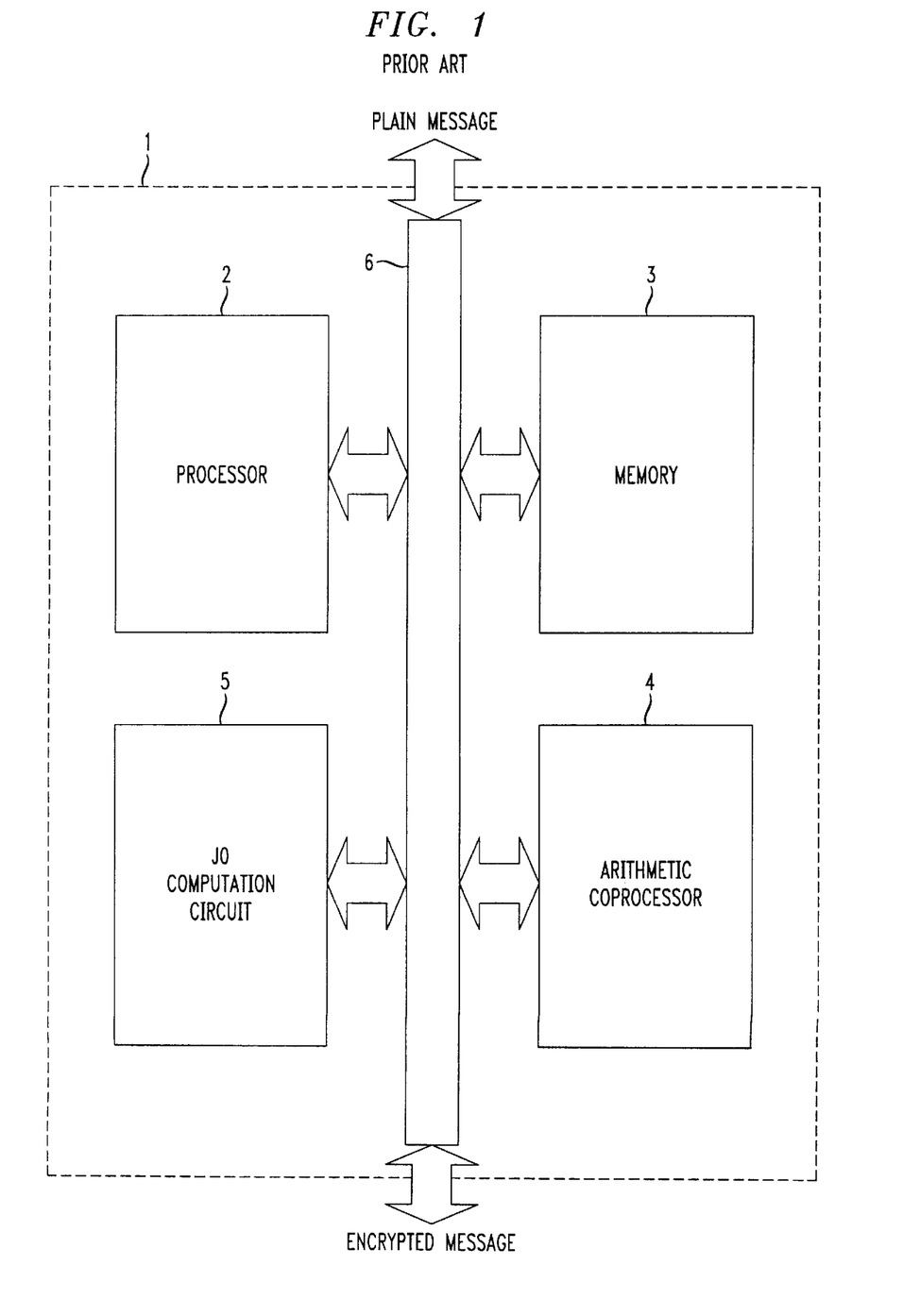
FIG. 1 shows an encryption circuit utilizing the computation parameter J0, according to the prior art.

FIG. 1 shows an encryption circuit utilizing the computation parameter J0, according to the prior art. FIG. 1 corresponds to FIG. 1 of the European Patent Application No. 778,518. FIG. 1 shows an encryption circuit 1 comprising a processor 2, a memory 3, a coprocessor 4, a circuit 5 dedicated for the computation of J0, and a communications bus 6. The processor 2 is, for example, an 8-bit, 16-bit or 32-bit microprocessor. The communications bus 6 connects the processor 2, the memory 3, the coprocessor 4 and the J0 computation circuit to one another. This communications bus 6 is also used to receive a plain message or an encrypted message. The encrypted message is received after processing via this same communications bus 6 after having been encrypted or decrypted. The communications bus 6 supports all the signals that are exchanged within the encryption circuit 1.

An encryption circuit 1 offers several possibilities of processing. A first possibility of processing is purely software. That is, the processor 2 will carry out all the encryption or decryption computations using a program stored in the memory 3. A processing operation of this kind does not require the presence of the coprocessor 4 and of the J0 computation circuit 5, but takes up a considerable amount of processing time.

A second possibility of processing includes processing all of the computations with the coprocessor 4. The processor 2 is used only to verify that the operations are running efficiently. This possibility provides for very high-speed processing, but limits the encryption to operations using data elements compatible with the coprocessor 4. Consequently, this prevents the performance of certain computations. The use of a J0 computation circuit 5 makes it possible to optimize the specific computation of the parameter J0.

A third possibility of processing includes a combined use of the processor 2, the coprocessor 4 and the J0 computation circuit 5. This provides for the ability to process all the types of encryption in a period of time smaller than that performed by the first possibility using purely software.

Figure 2:
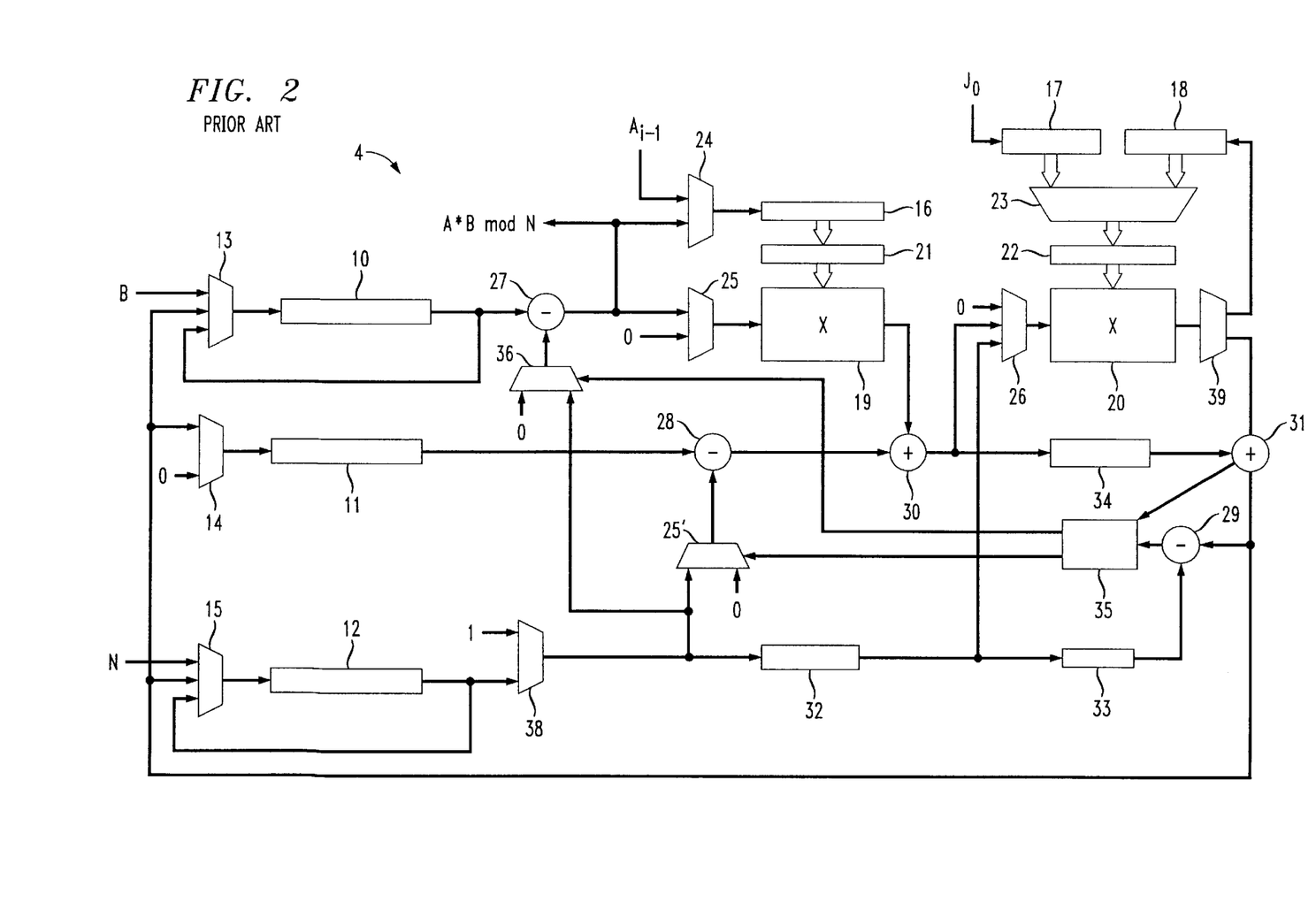
FIG. 2 shows a schematic view of a circuit enabling implementation of modular operations according to the Montgomery method, according to the prior art.

FIG. 2 shows a schematic view of a circuit enabling the implementation of the modular operations according to the Montgomery method. FIG. 2 corresponds to the FIG. 2 of the European Patent Application No. 778,518. FIG. 2 shows the modular arithmetic coprocessor 4. This coprocessor 4 comprises three shift registers 10, 11 and 12 with series input and output. Each of these registers has the same number of n cells, with n=m*Bt. These registers are capable of being subdivided, for example, into registers of n/2 cells and registers of Bt bits. Multiplexers 13, 14 and 15 are placed respectively before the register 10, 11 and 12. Multiplexers will also be placed before the subdivisions if these subdivisions exist. Three registers 16, 17 and 18 each comprises Bt cells. The registers 16, 17 and 18 are parallel output and series input registers.

This coprocessor 4 also comprises two multiplication circuits 19 and 20, each circuit comprises one series input, one parallel input and one series output. The parallel input of the multiplication circuit 19 is connected to the output of the register 16 by a storage flip-flop circuit 21 having Bt cells. The parallel input of the multiplication circuit 20 is connected to one of the outputs of the registers 17 or 18 by a storage flip-flop circuit 22 having Bt cells. This flip-flop circuit 22 is connected to one of the outputs of the registers 17 and 18 by a multiplexer 23 with two parallel inputs and one parallel output. This coprocessor 4 also comprises the following: multiplexers 24, 25, 25', 26, 36 and 38, a demultiplexer 39, series subtraction circuits 27, 28 and 29, series adder circuits 30 and 31, delay circuits 32, 33 and 34 to delay the propagation of binary data elements by Bt cycle periods, and a storage circuit 35 to store the comparison result.

For further details pertaining to the description of this circuit, reference is made to the European Patent Application EP-A 601,907. More particularly, reference is made to the discussion on page 15, lines 29–53, and page 17, line 51, through page 18, line 54 of the patent application. In a circuit of this type, when it is desired to carry out a Pfield operation, i.e., Pfield $(A, B)_N$, the procedure used is disclosed in the above referenced European patent EP-A 601,907. More particularly, reference is made to page 19, lines 1–49. In short, the following steps will be carried out:

E1: The following initial data elements are loaded. $A_0$, which represents the Bt least significant bits of A, is loaded into the register 16. B is loaded into the register 10, and N is loaded into the register 12. J0, which has been computed by a processor 2 external to the coprocessor 4, is loaded into the register 17.

E2: The computation of the first iteration is performed, where X, Y and Z are data elements in transit in the coprocessor 4 and where S is loaded into the register 11. The following substeps are performed:

B1: The computation of $X=B*A_0$.
B2: The computation of $Y=(X*J0)$ mod $2^{Bt}$, where the operation mod $2^{Bt}$ corresponds only to a truncation.
B3: The computation of $Z=X+(Y*N)$.
B4: The computation of $S=Z\backslash 2^{Bt}$, where the symbol \ represents an integer division.
B5: If S is greater than N, then N is subtracted from S.

E3: The computation of the following iterations are performed, where i varies from 1 to m−1:

B1: The loading of $A_i$ in place of $A_0$.
B2: The computation of $X=S+(B*A_i)$.
B3: The computation of $Y=(X*J0)$ mod $2^{Bt}$, where the operation mod $2^{Bt}$ corresponds only to a truncation.
B4: The computation of $Z=X+(Y*N)$.
B5: The computation of $S(i)=Z\backslash 2^{Bt}$, where the symbol \ represents an integer division.
B6: If S(i) is greater than N, then N is subtracted from S(i).

E4: At the last iteration, S is loaded into the register 10.

As disclosed in the previously referenced European Patent Application No. 778,518, the parameter J0 was usually computed by software external to the coprocessor, as shown in FIG. 2. To reduce the computation time of this parameter, the European Patent Application No. 778,518 discloses the use of the circuit 5 of FIG. 3, wherein this figure corresponds to FIG. 3 of the European Patent Application.

Figure 3:
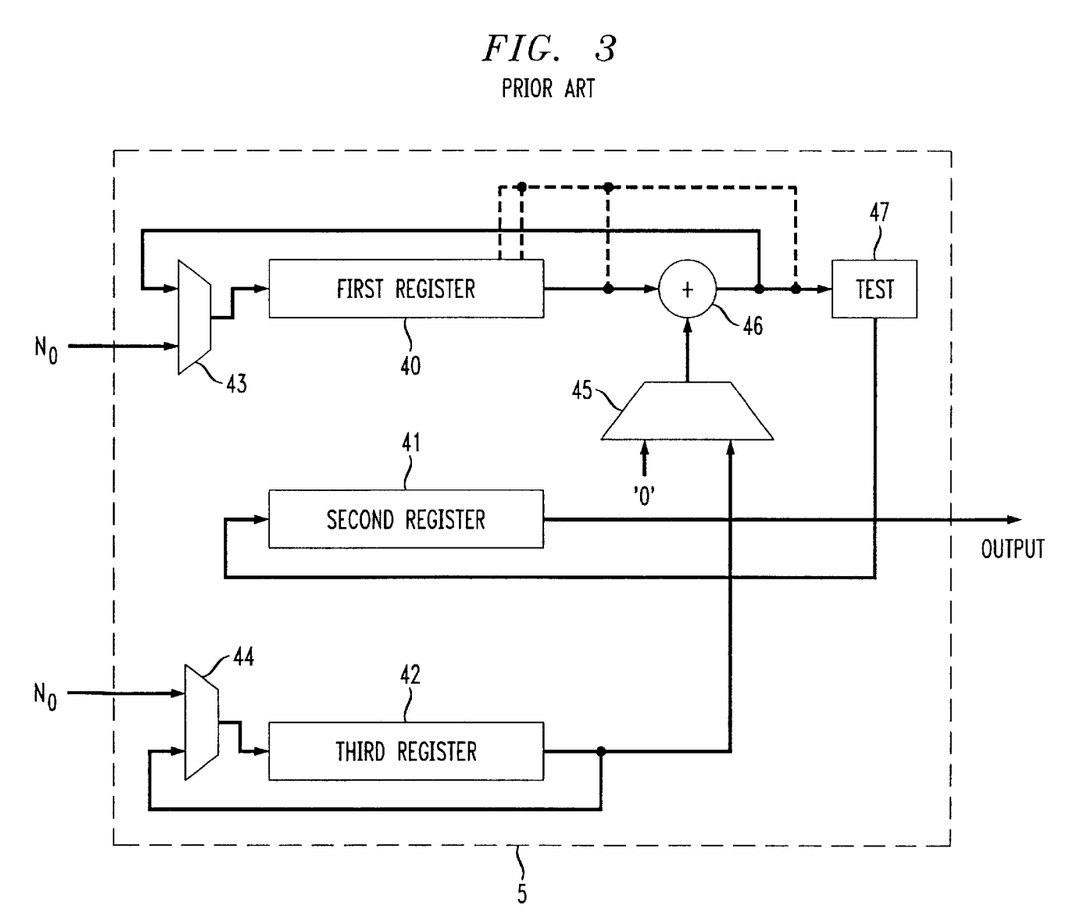
FIG. 3 shows a circuit for generation of the computation parameter J0, according to the prior art.

The circuit of FIG. 3 comprises a first shift register, a second shift register, and a third shift register 40, 41 and 42 with Bt bits. Each shift register has a series input and a series output. The circuit further comprises three multiplexers 43, 44 and 45 each having a first input and a second input and an output, an adder 46 having first and second series inputs and a series output, and a test circuit 47 having an input and an output.

These different elements are connected to one another as follows. The first register 40 has its input connected to the output of the multiplexer 43, and its output is connected to the first input of the adder 46. The second register 41 has its input connected to the output of the test circuit 47, and its output is connected to an output terminal. The third register has its input connected to the output of the multiplexer 44, and its output is connected to the first input of the multiplexer 44 and to the first input of the multiplexer 45. The multiplexer 43 has its first input connected to the output of the adder 46 and to the input of the test circuit 47. The multiplexer 43 has its second input connected to a first input terminal. The multiplexer 44 has its second input connected to a second input terminal. The multiplexer 45 has its second input connected to a logic zero, i.e., 0 volts.

To simplify the drawing of FIG. 3, the control signals for the multiplexers and the registers are not shown. The different control signals are generated by a state machine that can be made by one skilled in the art, particularly after reading a description of the operation of one of the referenced methods for the generation of the parameter J0 using this circuit.

The referenced European Patent Application No. 778,518 describes several methods used to compute the parameter J0 by using the circuit of FIG. 3. The methods are based on the following algorithm. J0(i) is the reference given to the $i^{th}$ bit of the data being sought J0:

$$X \text{ is encoded on } Bt \text{ bits such that } X = 0,$$
$$K = X = 0,$$
$$\text{For } i = 0 \text{ to } Bt - 1,$$
$$\text{If } K \bmod 2 = 0, J0(i) = 1;$$
$$\text{Else } J0(i) = 0;$$
$$K = K + N0 * J0(i),$$
$$K = K / 2,$$
$$X = X + N0 * J0(i),$$

For example, the following method is proposed:

Step 1: The binary data element N0 is encoded on Bt bits, where the least significant bit is equal to 1, is loaded into the Bt bit registers 40 and 42 using input terminals and multiplexers 43 and 44.

Step 2: The contents of the second register 41 are shifted by one unit towards the right. The loading of a 1 on the most significant bit of this register 41 is performed. The bit-by-bit addition of the contents of the register 40 with a zero in the series adder 46 is performed. The output of the adder is connected to the input of the register 40. The second bit of the second least significant bit at the output of the adder 46 is tested by the test circuit 47.

Step 3: Implementation of an iterative computation loop, indexed by i, with i varying from 1 to Bt−1 is performed. Each iteration of the loop comprises the following steps. The shifting of the contents of the register 40 by one unit towards the right is performed. This operation corresponds to a division by two of the contents of this register while overlooking the remainder. Depending on the result of the last test performed, if the bit checked is equal to 1, then the rightward shifting of the contents of the register 41 by one unit towards the right is performed. The loading of a zero by the test circuit on the most significant bit of the register 41 is performed. The bit-by-bit addition is performed on the contents of the registers 40 with a 0 in the adder 46. The output of the adder 46 is connected to the input of the register 40. The second least significant bit at the output of adder 46 is tested.

If the bit checked is not equal to 1, then the rightward shifting of the contents of the register 41 by one unit towards the right is performed. The loading of a 1 by the test circuit on the most significant bit of the register 41 is performed. The bit-by-bit addition of the contents of the registers 40 and 42 in the adder 46 is performed. The output of the adder 46 is connected to the input of the register 40. The output of the register 40 is looped to its input. The second least significant bit is tested at the output of the adder 46.

Once the loop is completed, the parameter J0 is available in the register 42. In all, as disclosed in column 9, line 7 of the referenced European Patent Application No. 778,518, the method uses $Bt^2+3*Bt-1$ clock cycles. There are several alternatives described in the referenced application. The computation time needed for these alternatives is determined by a general formula of $x1*Bt^2+y1*Bt-z1$, with x1, y1 and z1 being integers, and x1=1. By using variable size registers, it is possible to reduce the number of cycles needed and obtain a computation time with a general formula of $Bt^2/2+y2*Bt-z2$, with y2 and z2 being positive numbers. An example is provided on column 13, line 29 to column 14, line 2 of the referenced European Patent Application No. 778,518.

The present invention improves the methods described in the referenced European Patent Application No. 778,518 to reduce the computation time of the parameter J0. To do so, subsets of bits of J0 are computed. Thus, the search for Bt bits of J0 is eliminated by carrying out Bt bit-by-bit of additions of Bt-bit data elements. This induces a computation time proportional to $Bt^2$ in the methods of the prior art. It is assumed that the data element N0 and the result J0 are subdivided into an integer Q of binary data elements $N0_{Q-1} \ldots N0_0$ and $J0_{Q-1} \ldots J0_0$ which are encoded on L bits, with L as an integer such that L<Bt.

One algorithm proposed to compute $J0=J0_{Q-1} \ldots J0_0$ is the following, where $J0_j(i)$ denotes the $i^{th}$ bit of the data element of L bits $J0_j$.

X-A binary data element encoded on L*P bits with $X=X_{Q-1} \ldots X_0=0$.

K-A binary data element encoded on L bits with $K=X_0=X \mod 2^L=0$.

$$\text{For } j = 0 \text{ to } Q - 1,$$
$$\quad \text{For } i = 0 \text{ to } L - 1,$$
$$\quad\quad \text{If } K \mod 2 = 0, J0_j(i) = 1,$$
$$\quad\quad \text{Else } J0_j(i) = 0,$$
$$\quad\quad K = K + N0_0 * J0_j(i),$$
$$\quad\quad K = K/2,$$
$$\quad X = X + N0 * J0_j,$$
$$\quad X = (X/2^L) \mod 2^Q.$$

To implement the algorithm, loops are set up for the computation of the binary data elements $J0_j$, according to one of the methods described in the referenced European Patent Application No. 778,518. The method used is adapted to produce sub-operands of L bits instead of operands of Bt bits. Resources of the coprocessor are used for the updating, by multiplication, of the value of the binary data element X.

Figure 4:
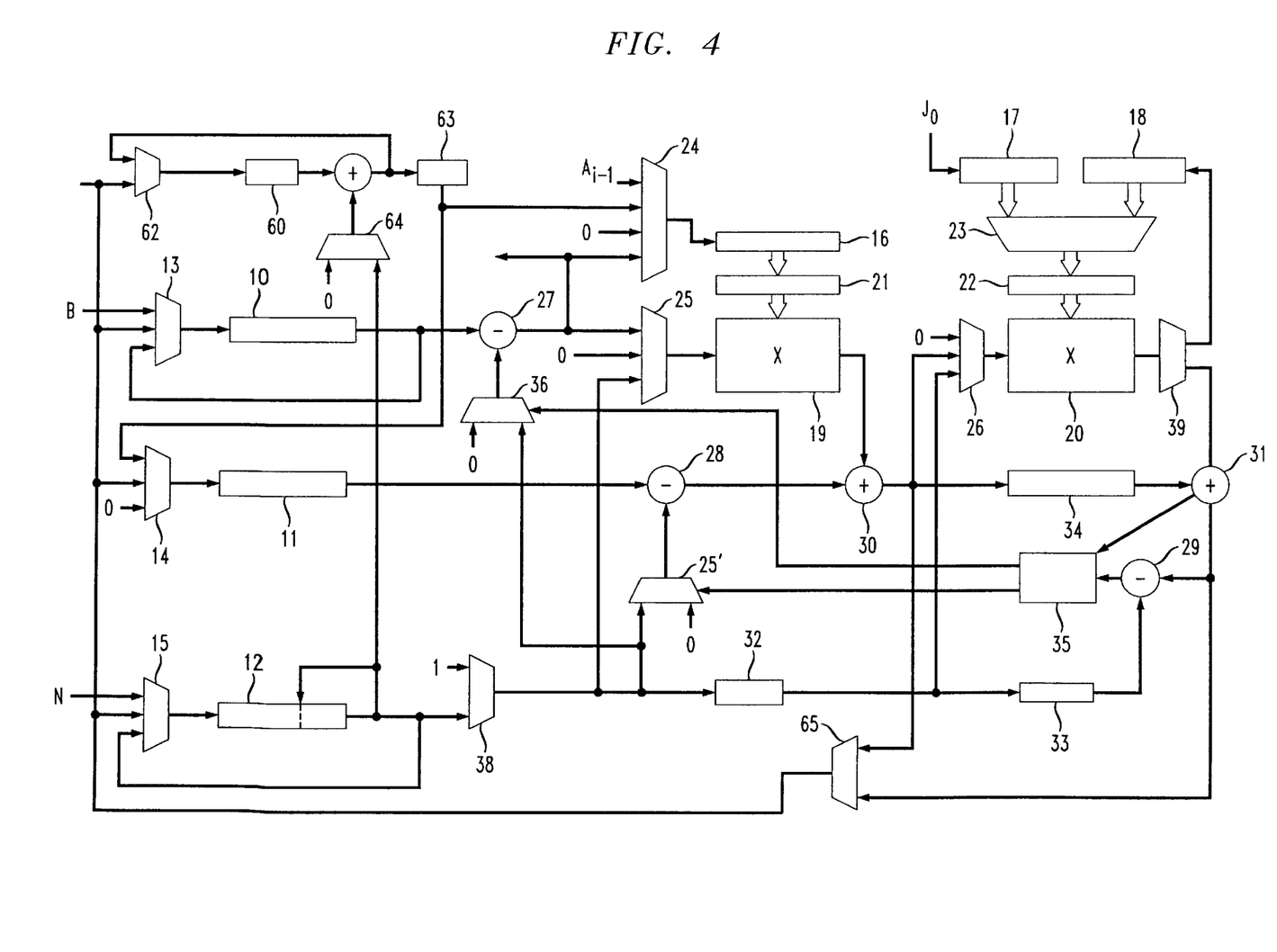
FIG. 4 shows the circuit of FIG. 2 modified according to the present invention.

FIG. 4 illustrates the coprocessor of FIG. 2. This coprocessor is adapted to implement the above-defined algorithm. This adaptation comprises the addition of elements used to form a circuit of the type shown in FIG. 3. It will also comprise a modification of its sequencing program which is not described in detail, but which will be readily appreciated by those skilled in the art, particularly if reference is made to the cited references that describe the methods to be implemented.

The circuit of FIG. 4 comprises, in addition to the various elements described in FIG. 2, a plurality of additional elements. These elements include a shift register 60 of L bits comprising one input and one output. A series adder 61 comprises two inputs and one series output. A multiplexer 62 comprises two inputs and one output. A test circuit 63 comprises one input and one output. A multiplexer 64 comprises two inputs and one output. A multiplexer 65 comprises two inputs and one output. Furthermore, the following elements have been modified. The multiplexer 14 has a third input, the multiplexer 25 has a third input, and the multiplexer 24 has a third a fourth input.

The input and the output of the register 60 are connected respectively to the output of the multiplexer 62 and to an input of the adder 61. The other input of the adder 61 is connected to the output of the multiplexer 64. One of the inputs of the multiplexer 64 is connected to the output of the register 12. Its other input receives a logic zero. The output of the adder 61 is connected to a first input of the multiplexer 62 and to the input of the test circuit 63. The output of this test circuit 63 is connected, firstly, to the third input of the multiplexer 24 and, secondly, to the third input of the multiplexer 14. The fourth input of the multiplexer 24 receives a logic zero.

The second input of the multiplexer 62 is connected to the output of the multiplexer 65. This output replaces the output of the adder 31 with respect to the registers 10, 11 and 12. The inputs of the multiplexer 65 are connected respectively to the outputs of the adders 30 and 31. The output of the multiplexer 38 is connected to the third input of the multiplexer 25.

The register 12 furthermore comprises means to form a circular register of L bits. These means, not shown, will be formed, for example, by a multiplexer used to connect its output to the input of the Lth cell, with the numbering of the cells starting from the output. It will also be assumed that the registers 10, 11 and 12 are formed by Q*L bits. If these registers have a size greater than N0 and J0, they could be reduced to the desired size, for example, by the register of FIG. 5.

To implement the algorithm described, the registers 10, 11, 12 and 60 are used to store respectively the binary data elements X, J0, N0 and K. The following procedures are to be followed:

Step 1: The binary data element N0, which is encoded on Q*L bits, is loaded into the register 12. The least significant bits of N0 are at 1. The loading of Q*L logic zeros into the register 10 and 11 and of L logic zeros into the register 60 are performed.

Step 2: Forming a loop of Q iterations comprises the following steps, which is indexed by j, with j varying from 0 to Q-1.

Step 2.1: Forming a loop of L iterations, indexed by i with i varying from 0 to L-1, comprises the steps of shifting the contents of the register 60 by one unit towards the right. This operation corresponds to a division by two of the contents of this register while overlooking the remainder. The bit derived from this shift in the test circuit 63 is tested. If the bit checked is equal to 1, then the rightward shifting of the contents of the register 11 by one unit towards the right is performed. A 0 is loaded by the test circuit 63 on the most significant bit of the register 11 and in the register 16. The bit-by-bit addition of the contents of the register 60 with a zero in the adder 61 is performed. The output of the adder 61 is connected to the input of the register 60. The second least significant bit is tested at the output of the adder 61.

If the bit checked is not equal to 1, then the rightward shifting of the contents of the register 11 by one unit towards the right is performed. The loading of a 1 by the test circuit on the most significant bit of the register 11 and in the register 16 is performed. The bit-by-bit addition of the contents of the register 60 and the L last bits of the register 12 is performed. In the adder 61, the output of the adder 61 is connected to the input of the register 60. The register 12 forms an L bit register whose input and output are connected. The second least significant bit is tested at the output of the adder 61.

Step 2.2: The shifting of the contents of the entire register 12 is performed. The multiplication in the multiplication circuit 19 of the contents of the register 12 by the contents of the register 16 is performed. The register 16 is replenished with logic zeros if its size is greater than L. The shifting of the contents of the register 10 and the addition of these contents with the result of the multiplication, encoded on (Q*L+P) bits, is performed in the adder 30. The storage in the register 10 of the Q*L most significant bits of the binary data element produced by the adder 30 is performed. The storage of the L least significant bits of these Q*L bits is performed in the register 60. At the end of this procedure, the desired data element is in the register 11.

To perform the initial loading of the registers, the computations of the data elements J0$_j$ and the multiplication operations are performed. It is necessary to have (Q*L)+Q*(x*L$^2$+y*P−z)+Q*L*(Q+1) cycle times, namely Q*[L+L*(Q+1)+(x*L$^2$+y*P−z)] cycle times, assuming that the register 16 has a size L. In this case, it is not necessary to add an input, receiving a zero, to the multiplexer 24. With N0 and J0 encoded on Q*L=128 bits, x=1, y=3 and z=1, the method of the prior art requires 16,767 cycle times in considering the formula Bt$^2$+3*Bt−1. With L=8 and Q=16, the above method requires only 3,584 cycle times, i.e., a very substantial reduction is obtained in the computation time.

It will be noted that it is possible to improve the method by observing that the bit J0$_0$(0) is necessarily equal to 1. The Q$^{th}$ multiplication is not necessary. The register 11 has received the L most significant bits of the data element J0 from the test circuit 63 during the step 2.1 of the Q$^{th}$ iteration. To minimize the computation time, it is thus possible to modify the steps of the method as follows.

With respect to the step 2.1, i=j=0. The contents are shifted of the register 11 by one unit towards the right and the loading of a 1 on the most significant bit of this register and in the register 16 are performed. It is possible, for example, to add an input to the multiplexer 24. This input receives a logic 1. The bit-by-bit addition of the contents of the register 60 with a zero is performed in the adder 61. The output of this adder is connected to the input of the register 60. The testing of the second least significant bit at the output of the adder 61 is performed by the test circuit 63.

A loop of L iterations is formed, indexed by i with i varying from 0 to L−1 if j is different from 1 and, if not, from 1 to L−1. The loop comprises the following steps. The shifting of the contents of the register 60 by one unit towards the right is performed. This operation corresponds to a division by two of the contents of this register while overlooking the remainder. The bit derived from this shift is tested. If the bit checked is equal to 1, then the rightward shifting of the contents of the register 11 by one unit towards the right is performed. The loading of a 0 by the test circuit 63 on the most significant bit of the register 11 and in the register 16 is performed. The bit-by-bit addition on the contents of the register 60 is performed with a zero in the adder 61. The output of the adder 61 is connected to the input of the register 60. The testing of the second least significant bit at the output of the adder 61 is performed.

If the bit checked is not equal to 1, the rightward shifting of the contents of the register 11 by one unit towards the right is performed. The loading of a 1 by the test circuit on the most significant bit of the register 11 and in the register 16 is performed. The bit-by-bit addition of the contents of the register 60 and the L last bits of the register 12 is performed in the adder 61. The output of the adder 61 is connected to the input of the register 60. The register 12 forms an L bit register whose input and output are connected, and the second least significant bit is tested at an output of the adder 61.

With regard to the step 2.2, during the Q−1 first iterations, the shifting of the contents of the entire register 12 is performed. The multiplication in the multiplication circuit 19 of the contents of the register 12 by the contents of the register 16 is performed. This register 16 has been replenished with logic zeros if its size is greater than L. The shifting of the contents of the register 10 and the addition of these contents with the result of the multiplication, encoded on (Q*L+P) bits, is performed in the adder 30.

The storage in the register 10 of the Q*L most significant bits of the binary data element produced by the adder 30 is performed. The storage of the L least significant bits of these Q*L bits is performed in the register 60. According to one variation, the algorithm computes J0=J0$_{Q-1}$ . . . J0$_0$ according to the following parameters:

X=0, $$K = X0 = X \bmod 2^L = 0,$$

$$\text{For } j = 0 \text{ to } Q - 1,$$

$$\text{For } i = 0 \text{ to } L - 1,$$

$$\text{If } K \bmod 2 = 0, J0_j(i) = 1,$$

$$\text{Else } J0_j(i) = 0,$$

$$K = K + N0_0 * J0_j(i),$$

$$K = K/2,$$

$$X = X + N0 * J0_j,$$

$$X = (X/2^L) \bmod 2^{LQ}.$$

Figure 5:
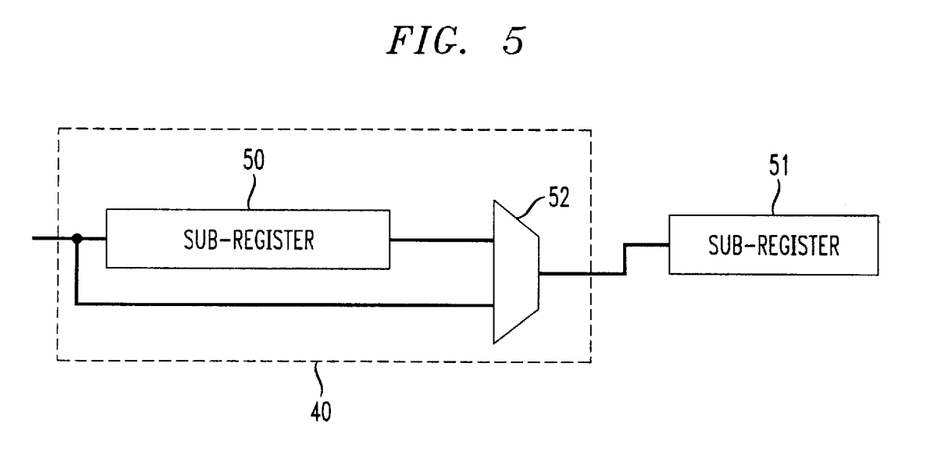
FIG. 5 shows a shift register, according to the present invention.

To implement this algorithm, it is sufficient to use a variable size register 10 to store X, and to store only the L*(Q−j) most significant bits of the data element produced by the multiplication circuit 19. An exemplary register of this kind is described in FIG. 5. FIG. 5 shows a register 40 which could also be one of the registers 10, 11, 22, 41 or 42. This can be subdivided into two shift registers 50 and 51 respectively of Bt-L and L bits, each having one series input and one series output. A multiplexer 52 having a first input is connected to the output of the register 50. A second input is connected to the input of the register 50 and an output is connected to the input of the register 51.

A device of this kind operates like a shift register 40 having its input merged with the input of the register 51 and its output merged with the output of the register 51. However, depending on the command of the multiplexer, the shift register 40 will have a size varying by L or Bt bits. Those skilled in the art will have no difficulty in implementing a register subdivided into three, four or more sub-registers that can be used to obtain registers having a greater number of configurations. In this case, it can be shown that the computation time is given by the following formula: Q*[L+L*(Q+4)/2+(x*L$^2$+y*L+z)], thus reducing the necessary cycle times to 2800.

To implement the above-mentioned algorithm, it is sufficient to modify the step 2.2, as defined in the first method. With respect to the step 2.2, the shifting of the contents of the entire register 12 is performed. The multiplication in the multiplication circuit 19 of the contents of the register 12 by the contents of the register 16 is also performed. The shifting of the contents of the register 10 and the addition of these contents with the result of the multiplication encoded on (Q*L+P) bits is performed in the adder 30. The storage in the register 10 of the (Q−j)*L most significant bits of the binary data element produced by the adder 30 is performed and the storage of the L least significant bits of these Q*L bits is performed in the register 60.

It is possible, just as in the first method illustrated, to reduce the computation time by modifying the steps 2.1 and 2.2 to take account of the fact that $J0_0(0)=1$ and that the last multiplication is not necessary. Naturally, it is possible without going beyond the scope of the invention, to use a coprocessor that is modified differently from the example shown in FIG. 4. Thus, it is possible to use dedicated registers to store the data elements X, J0 and N0. It is also possible to use the multiplication circuit 20 and the addition circuit 31 to compute X. It will be sufficient to adapt the multiplexers and add the necessary connections to connect the elements that are used in the computations with one another. These adaptations would not present any problems for those skilled in the art.

That which is claimed is:

1. A method for the production, in an integrated circuit, of a parameter J0 associated with the implementation of modular operations according to the Montgomery method, with J0 encoded on Q*L bits such that J0=J0L−1 ... J00, with Q and L being integers, wherein the method comprises the following steps:

Step 1: the loading of a binary data element N0, encoded on Q*L bits, the least significant bit of N0 being equal to 1, in a first register, the loading of Q*L zeros in the second and third register and L zeros in a fourth register;

Step 2: the making of a loop of Q iterations comprising the following steps, indexed by j, with j varying from 0 to Q−1:

Step 2.1: the making of a loop of L iterations, indexed by i with i varying from 0 to L−1, comprising the following steps:

the shifting of the contents of the fourth register by one unit towards the right, this operation corresponding to a division by two of the contents of this register, in overlooking the remainder;

the testing of the bit derived from this shift in a test circuit:

If the bit checked is at 1: the rightward shifting of the contents of the third register by one unit towards the right and the loading of a zero, on the most significant bit of this register and in a fifth register; the bit-by-bit addition of the contents of the fourth register with a zero in a first adder, an output of this first adder being connected to the input of the fourth register, and the testing of the second least significant bit at output of the first adder;

Else: the rightward shifting of the contents of the third register by one unit towards the right; the loading of a 1 on the most significant bit of the third register and in the fifth register; the bit-by-bit addition of the contents of the fourth register and the L last bits of the first register in the first adder, the output of this first adder being connected to the input of the fourth register, the first register forming an L bit register whose input and output are connected, and the testing of the second least significant bit at output of the first adder;

Step 2.2: The shifting of the contents of the entire first register and the multiplication, in a multiplication circuit, of the contents of the first register by the contents of the fifth register, said fifth register having been replenished with logic zeros if its size is greater than L; the shifting of the contents of the second register and the addition of these contents with the result of the multiplication, encoded on Q*L+L bits, in a second adder; the storage, in the second register, of the Q*L most significant bits of the binary data element produced by the second adder, and the storage of the L least significant bits of these Q*L bits in the fourth register.

2. A method according to claim 1, wherein the step 2.2 is the following:

During the Q−1 first iterations:

the shifting of the contents of the entire first register and the multiplication, in a multiplication circuit, of the contents of the first register by the contents of the fifth register, this fifth register having been replenished with logic zeros if its size is greater than L; the shifting of the contents of the second register and the addition of these contents with the result of the multiplication, encoded on Q*L+L bits, in a second adder; the storage, in the second register, of the Q*L most significant bits of the binary data element produced by the second adder, and the storage of the L least significant bits of these Q*L bits in the fourth register.

3. A method according to claim 1, wherein the step 2.2 is the following:

the shifting of the contents of the entire first register and the multiplication, in a multiplication circuit, of the contents of the first register by the contents of the fifth register, this fifth register having been replenished with logic zeros if its size is greater than L; the shifting of the contents of the second register and the addition of these contents with the result of the multiplication, encoded on Q*L+L bits, in a second adder; the storage, in the second register, of the [Q−j]*L most significant bits of the binary data element produced by the second adder, and the storage of the L least significant bits of these [Q−j]*L bits in the fourth register.

4. A method according to claim 1, wherein the step 2.2 is the following:

during the Q−1 first iterations:

the shifting of the contents of the entire first register and the multiplication, in a multiplication circuit, of the contents of the first register by the contents of the fifth register, this fifth register having been replenished with logic zeros if its size is greater than L; the shifting of the contents of the second register and the addition of these contents with the result of the multiplication, encoded on Q*L+L bits, in a second adder; the storage, in the second register, of the [Q−j]*L most significant bits of the binary data element produced by the second adder and the storage of the L least significant bits of these [Q−j]*L bits in the fourth register.

5. A method according to one of the claims 1 to 4, wherein the step 2.1 is the following:

for i=j=0:

the shifting of the contents of the third register by one unit towards the right and the loading of a 1 on the most significant bit of this third register and in a fifth register; the bit-by-bit addition of the contents of the fourth register with a zero in a first adder, the output of this first adder being connected to the input of the fourth register; the testing of the second least significant bit at the output of the first adder by means of a test circuit;

the making of a loop of L iterations indexed by i with i varying from 0 to L−1 if j is different from 0 and, if not, from 1 to L−1, the loop comprising the following steps:

the shifting of the contents of the fourth register by one unit towards the right, this operation corresponding to a division by two of the contents of this register, in overlooking the remainder;

the testing of the bit derived from this shift in a test circuit;

If the bit checked is at 1: the rightward shifting of the contents of the third register by one unit towards the right; the loading of a zero on the most significant bit of the third register and in the fifth register; the bit-by-bit addition of the contents of the fourth register with a zero in the first adder, the output of the first adder being connected to the input of the fourth register, and the testing of the second least significant bit at output of the first adder;

Else: the rightward shifting of the contents of the third register by one unit towards the right; the loading of a 1 on the most significant bit of the third register and in the fifth register; the bit-by-bit addition of the contents of the fourth register and the L last bits of the first register in the first adder, the output of the first adder being connected to the input of the fourth register, the first register forming an L bit register whose input and output are connected, and the testing of the second least significant bit at output of the first adder.

6. A method for generating in an integrated circuit a parameter J0 associated with implementation of modular operations according to the Montgomery method, with J0 encoded on Q*L bits such that $J0=J0_{L-1}\ldots J0_0$, with Q and L being integers, the method comprising the steps of:

Step 1: loading a binary data element N0 in a first register with N0 being encoded on Q*L bits and a least significant bit of N0 being equal to 1, loading Q*L zeros in a second and a third register, and loading L zeros in a fourth register; and Step 2: making a loop of Q iterations comprising the following steps, indexed by j, with j varying from 0 to Q−1, Step 2.1: making a loop of L iterations indexed by i with i varying from 0 to L−1, comprising the following steps shifting contents of the fourth register by one unit towards the right, this operation corresponding to a division by two of the contents of the fourth register while overlooking the remainder, testing a bit derived from this shift in a test circuit, and if the bit checked is 1, performing the following steps shifting contents of the third register by one unit towards the right, loading a zero at a most significant bit of the third register and in a fifth register, adding bit-by-bit contents of the fourth register with a zero in a first adder, an output of the first adder connected to an input of the fourth register, and testing a second least significant bit at an output of the first adder, if the bit checked in the testing step is not 1, performing the following steps shifting contents of the third register by one unit towards the right, loading a 1 at a most significant bit of the third register and in the fifth register, adding bit-by-bit contents of the fourth register and L last bits of the first register in the first adder, an output of the first adder connected to an input of the fourth register, the first register defining an L bit register having an input and an output connected together, and testing a second least significant bit at an output of the first adder;

Step 2.2: shifting contents of the entire first register, multiplying in a multiplication circuit contents of the first register by contents of the fifth register, the fifth register being replenished with logic zeros if its size is greater than L, shifting contents of the second register and adding the contents with a result of the multiplication, encoded on Q*L+L bits, in a second adder, storing in the second register Q*L most significant bits of the binary data element produced by the second adder, and storing L least significant bits of the Q*L bits in the fourth register.

7. A method according to claim 6, wherein during a Q−1 first iterations the Step 2.2 comprises the steps of:

shifting contents of the entire first register;

multiplying in a multiplication circuit contents of the first register by contents of the fifth register, the fifth register being replenished with logic zeros if its size is greater than L;

shifting contents of the second register and adding the contents with the result of the multiplication, encoded on Q*L+L bits, in a second adder;

storing in the second register Q*L most significant bits of the binary data element produced by the second adder; and storing L least significant bits of the Q*L bits in the fourth register.

8. A method according to claim 6, wherein the Step 2.2 further comprises the steps of:

storing in the second register (Q−j)*L most significant bits of a binary data element generated by the second adder; and storing L least significant bits of these (Q−j)*L bits in the fourth register.

9. A method according to claim 6, wherein during a Q−1 first iterations the Step 2.2 comprises the steps of:

shifting contents of the entire first register;

multiplying in a multiplication circuit contents of the first register by contents of the fifth register, the fifth register being replenished with logic zeros if its size is greater than L;

shifting contents of the second register;

adding the contents with the result of the multiplication, encoded on Q*L+L bits, in a second adder;

storing in the second register (Q−j)*L most significant bits of a binary data element produced by the second adder; and storing L least significant bits of the (Q−j)*L bits in the fourth register.

10. A method according to claim 6, wherein for i=j=0, the Step 2.1 comprises the steps of:
- shifting contents of the third register by one unit towards the right;
- loading a 1 at a most significant bit in the third register and in a fifth register;
- adding bit-by-bit contents of the fourth register with a zero in a first adder, an output of the first adder connected to an input of the fourth register;
- testing a second least significant bit at an output of the first adder by a test circuit; and
- making a loop of L iterations indexed by i with i varying from 0 to L-1 if j is different from 0 and, if not, from 1 to L-1, comprising the following steps
  - shifting contents of the fourth register by one unit towards the right, corresponding to a division by two of the contents of the fourth register while overlooking a remainder,
  - testing a bit derived from the rightward shift in a test circuit, and if the bit checked is a 1, shifting rightward contents of the third register by one unit towards the right, loading a zero at a most significant bit of the third register and in the fifth register, adding bit-by-bit contents of the fourth register with a zero in the first adder, an output of the first adder connected to the input of the fourth register, testing a second least significant bit at an output of the first adder,
  - if the bit checked at the testing step is not at 1, shifting rightward contents of the third register by one unit towards the right, loading a 1 at a most significant bit of the third register and in the fifth register, adding bit-by-bit contents of the fourth register and an L last bits of the first register in the first adder, an output of the first adder connected to an input of the fourth register, defining an L bit register using the first register whose input and output are connected, and testing a second least significant bit at an output of the first adder.

11. A method for generating in an integrated circuit a parameter J0 associated with implementation of modular operations according to the Montgomery method, with J0 encoded on $Q*L$ bits such that $J0=J0_{L-1} \ldots J0_0$, with Q and L being integers, the method comprising the steps of:
- Step 1: loading a binary data element N0 in a first register with N0 being encoded on $Q*L$ bits and a least significant bit of N0 being equal to 1, loading $Q*L$ zeros in a second and a third register, and loading L zeros in a fourth register; and
- Step 2: making a loop of Q iterations comprising the following steps, indexed by j, with j varying from 0 to Q-1,
  - Step 2.1: making a loop of L iterations indexed by i with i varying from 0 to L-1, comprising the following steps
    - shifting contents of the fourth register by one unit towards the right, this operation corresponding to a division by two of the contents of the fourth register while overlooking the remainder,
    - testing a bit derived from this shift in a test circuit, and if the bit checked is 1, performing the following steps
      - shifting contents of the third register by one unit towards the right,
      - loading a zero at a most significant bit of the third register and in a fifth register,
      - adding bit-by-bit contents of the fourth register with a zero in a first adder, an output of the first adder connected to an input of the fourth register, and
      - testing a second least significant bit at an output of the first adder,
    - if the bit checked in the testing step is not 1, performing the following steps
      - shifting contents of the third register by one unit towards the right,
      - loading a 1 at a most significant bit of the third register and in the fifth register,
      - adding bit-by-bit contents of the fourth register and L last bits of the first register in the first adder, an output of the first adder connected to an input of the fourth register, the first register defining an L bit register having an input and an output connected together, and
      - testing a second least significant bit at an output of the first adder;
  - Step 2.2: during a Q-1 first iterations shifting contents of the entire first register,
    - multiplying in a multiplication circuit contents of the first register by contents of the fifth register, the fifth register being replenished with logic zeros if its size is greater than L,
    - shifting contents of the second register and adding the contents with the result of the multiplication, encoded on $Q*L+L$ bits, in a second adder,
    - storing in the second register $Q*L$ most significant bits of the binary data element produced by the second adder, and
    - storing L least significant bits of the $Q*L$ bits in the fourth register.

12. A method according to claim 11, wherein the Step 2.2 further comprises the steps of:
- storing in the second register $(Q-j)*L$ most significant bits of a binary data element generated by the second adder; and
- storing L least significant bits of these $(Q-j)*L$ bits in the fourth register.

13. A method according to claim 11, wherein during a Q-1 first iterations the Step 2.2 comprises the steps of:
- shifting contents of the entire first register;
- multiplying in a multiplication circuit contents of the first register by contents of the fifth register, the fifth register being replenished with logic zeros if its size is greater than L;
- shifting contents of the second register;
- adding the contents with the result of the multiplication, encoded on $Q*L+L$ bits, in a second adder;
- storing in the second register $(Q-j)*L$ most significant bits of a binary data element produced by the second adder; and
- storing L least significant bits of the $(Q-j)*L$ bits in the fourth register.

14. A method according to claim 11, wherein for i=j=0, the Step 2.1 comprises the steps of:
- shifting contents of the third register by one unit towards the right;
- loading a 1 at a most significant bit in the third register and in a fifth register;
- adding bit-by-bit contents of the fourth register with a zero in a first adder, an output of the first adder connected to an input of the fourth register;

testing a second least significant bit at an output of the first adder by a test circuit; and making a loop of L iterations indexed by i with i varying from 0 to L−1 if j is different from 0 and, if not, from 1 to L−1, comprising the following steps shifting contents of the fourth register by one unit towards the right, corresponding to a division by two of the contents of the fourth register while overlooking a remainder, testing a bit derived from the rightward shift in a test circuit, and if the bit checked is a 1, shifting rightward contents of the third register by one unit towards the right, loading a zero at a most significant bit of the third register and in the fifth register, adding bit-by-bit contents of the fourth register with a zero in the first adder, an output of the first adder connected to the input of the fourth register, testing a second least significant bit at an output of the first adder, if the bit checked at the testing step is not at 1, shifting rightward contents of the third register by one unit towards the right, loading a 1 at a most significant bit of the third register and in the fifth register, adding bit-by-bit contents of the fourth register and an L last bits of the first register in the first adder, an output of the first adder connected to an input of the fourth register, defining an L bit register using the first register whose input and output are connected, and testing a second least significant bit at an output of the first adder.

15. An integrated circuit for generating a parameter J0 associated with implementation of modular operations according to the Montgomery method, with J0 encoded on $Q*L$ bits such that $J0=J0_{L-1} \ldots J0_0$, with Q and L being integers, the integrated circuit comprising:

a processor including a plurality of registers and adders, said processor comprising means for performing the following steps:

Step 1: loading a binary data element N0 in a first register with N0 being encoded on $Q*L$ bits and a least significant bit of N0 being equal to 1, loading $Q*L$ zeros in a second and a third register, and loading L zeros in a fourth register; and Step 2: making a loop of Q iterations comprising the following steps, indexed by j, with j varying from 0 to Q−1, Step 2.1: making a loop of L iterations indexed by i with i varying from 0 to L−1, comprising the following steps shifting contents of the fourth register by one unit towards the right, this operation corresponding to a division by two of the contents of the fourth register while overlooking the remainder, testing a bit derived from this shift in a test circuit, and if the bit checked is 1, performing the following steps shifting contents of the third register by one unit towards the right, loading a zero at a most significant bit of the third register and in a fifth register, adding bit-by-bit contents of the fourth register with a zero in a first adder, an output of the first adder connected to an input of the fourth register, and testing a second least significant bit at an output of the first adder, if the bit checked in the testing step is not 1, performing the following steps shifting contents of the third register by one unit towards the right, loading a 1 at a most significant bit of the third register and in the fifth register, adding bit-by-bit contents of the fourth register and L last bits of the first register in the first adder, an output of the first adder connected to an input of the fourth register, the first register defining an L bit register having an input and an output connected together, and testing a second least significant bit at an output of the first adder;

Step 2.2: shifting contents of the entire first register, multiplying in a multiplication circuit contents of the first register by contents of the fifth register, the fifth register being replenished with logic zeros if its size is greater than L, shifting contents of the second register and adding the contents with a result of the multiplication, encoded on $Q*L+L$ bits, in a second adder, storing in the second register $Q*L$ most significant bits of the binary data element produced by the second adder, and storing L least significant bits of the $Q*L$ bits in the fourth register.

16. An integrated circuit according to claim 15, wherein during a Q−1 first iterations the Step 2.2 comprises the steps of:

shifting contents of the entire first register;

multiplying in a multiplication circuit contents of the first register by contents of the fifth register, the fifth register being replenished with logic zeros if its size is greater than L;

shifting contents of the second register and adding the contents with the result of the multiplication, encoded on $Q*L+L$ bits, in a second adder;

storing in the second register $Q*L$ most significant bits of the binary data element produced by the second adder; and storing L least significant bits of the $Q*L$ bits in the fourth register.

17. An integrated circuit according to claim 15, wherein the Step 2.2 further comprises the steps of:

storing in the second register $(Q-j)*L$ most significant bits of a binary data element generated by the second adder; and storing L least significant bits of these $(Q-j)*L$ bits in the fourth register.

18. An integrated circuit according to claim 15, wherein during a Q−1 first iterations, the Step 2.2 comprises the steps of:

shifting contents of the entire first register;

multiplying in a multiplication circuit contents of the first register by contents of the fifth register, the fifth register being replenished with logic zeros if its size is greater than L;

shifting contents of the second register;

adding the contents with the result of the multiplication, encoded on $Q*L+L$ bits, in a second adder;

storing in the second register $(Q-j)*L$ most significant bits of a binary data element produced by the second adder; and storing L least significant bits of the $(Q-j)*L$ bits in the fourth register.

19. An integrated circuit according to claim 15, wherein for i=j=0, the Step 2.1 comprises the steps of:

shifting contents of the third register by one unit towards the right;

loading a 1 at a most significant bit in the third register and in a fifth register;

adding bit-by-bit contents of the fourth register with a zero in a first adder, an output of the first adder connected to an input of the fourth register;

testing a second least significant bit at an output of the first adder by a test circuit; and making a loop of L iterations indexed by i with i varying from 0 to L−1 if j is different from 0 and, if not, from 1 to L−1, comprising the following steps shifting contents of the fourth register by one unit towards the right, corresponding to a division by two of the contents of the fourth register while overlooking a remainder, testing a bit derived from the rightward shift in a test circuit, and if the bit checked is a 1, shifting rightward contents of the third register by one unit towards the right, loading a zero at a most significant bit of the third register and in the fifth register, adding bit-by-bit contents of the fourth register with a zero in the first adder, an output of the first adder connected to the input of the fourth register, testing a second least significant bit at an output of the first adder, if the bit checked at the testing step is not at 1, shifting rightward contents of the third register by one unit towards the right, loading a 1 at a most significant bit of the third register and in the fifth register, adding bit-by-bit contents of the fourth register and an L last bits of the first register in the first adder, an output of the first adder connected to an input of the fourth register, defining an L bit register using the first register whose input and output are connected, and testing a second least significant bit at an output of the first adder.

* * * * *